Sept. 1, 1925.
S. A. CRONE
RAILWAY BRAKE BEAM
Filed Feb. 3, 1925
1,552,050
2 Sheets-Sheet 2
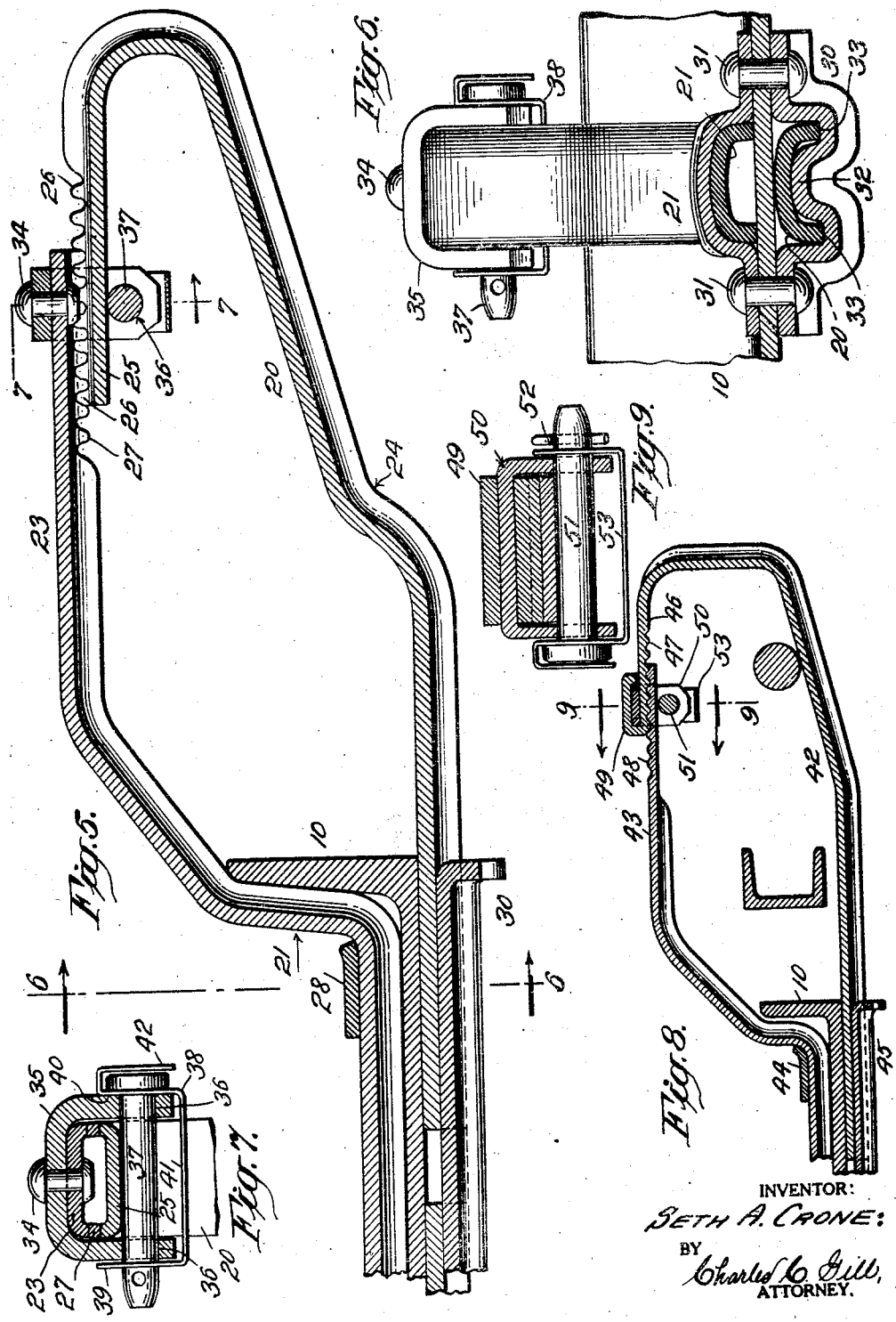
INVENTOR:
SETH A. CRONE:
BY
Charles C. Gill,
ATTORNEY.

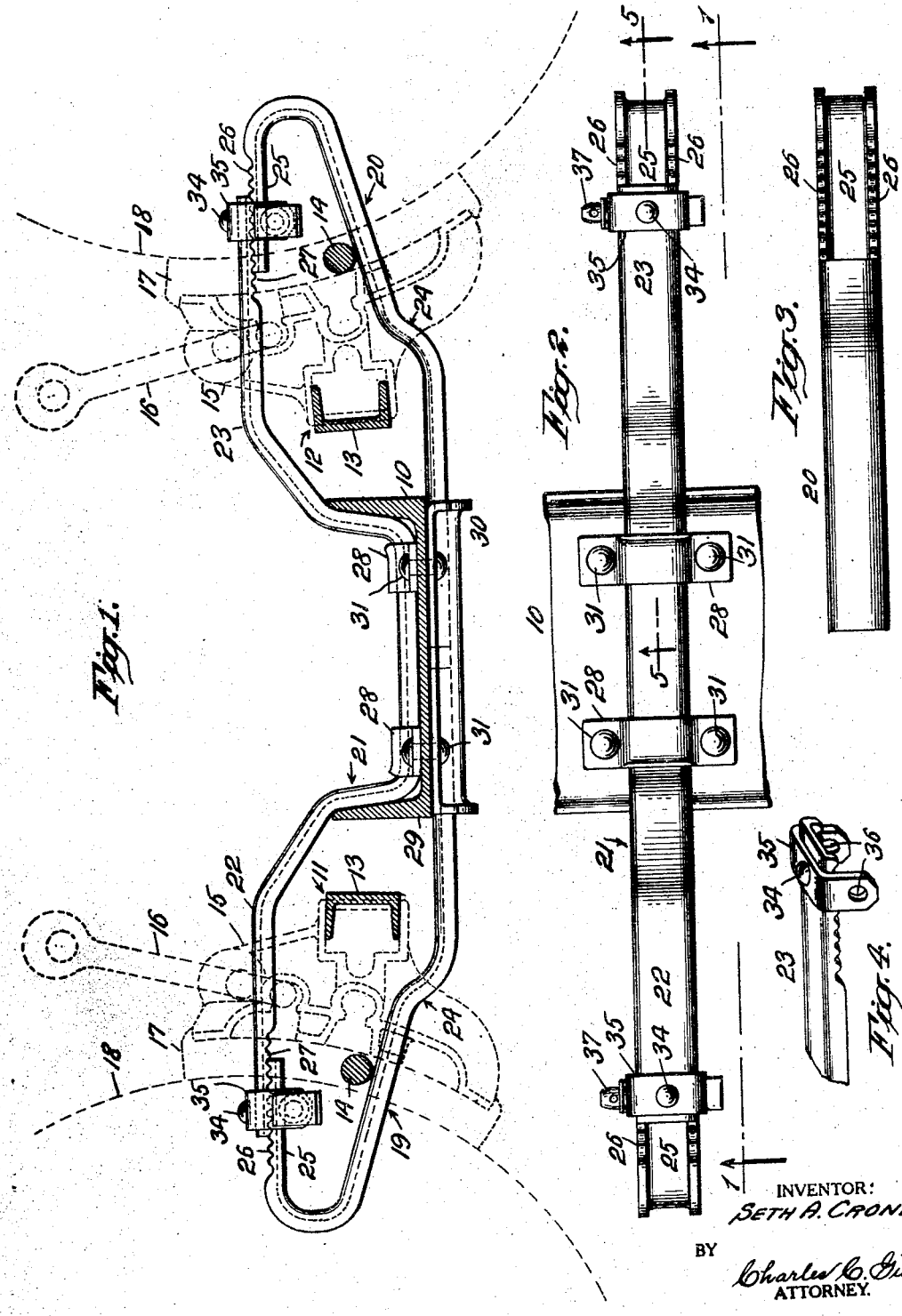

Patented Sept. 1, 1925.

1,552,050

UNITED STATES PATENT OFFICE.

SETH A. CRONE, OF EAST ORANGE, NEW JERSEY, ASSIGNOR TO BUFFALO BRAKE BEAM COMPANY, OF NEW YORK, N. Y., A CORPORATION OF NEW YORK.

RAILWAY BRAKE BEAM.

Application filed February 3, 1925. Serial No. 6,506.

*To all whom it may concern:*

Be it known that I, SETH A. CRONE, a citizen of the United States, residing at East Orange, Essex County, State of New Jersey, have invented certain new and useful Improvements in Railway Brake Beams, of which the following is a specification.

The invention pertains more particularly to a four-point suspension for inside-hung brake beams and to guards extending lengthwise of the car truck and above the brake beams and cooperating with the respective carrier or tramway bars or members of the four-point suspension, for holding the beams captive, while at the same time permitting the beams to have their requisite movements in the service application of the brakes to and their release from the car wheels.

The carrier-tramway bars and the cooperating safety guard bars presented herein are substantially disclosed in Letters Patent granted to me December 16, 1924, No. 1,519,764, and in my pending applications for Letters Patent Serial No. 725,318 filed July 11, 1924 and Serial No. 732,169 filed August 15, 1924.

The present invention, however, involves modifications of the carrier or tramway bars and of the guard bars or members, more particularly at the points of connection between the outer portions of said carrier bars and guard members. One of the more important objects of the present invention is to provide means for the relative adjustment of the connected outer end portions of the carrier and guard bars to meet such conditions as may arise from time to time from the irregularities in car truck construction, and also such conditions as may arise from the shrinkage of the metal bars on cooling and roughness or small irregularities in the bars or in the means securing them to the spring plank or otherwise, whereby the ends of said carrier and guard bars might not accurately register with each other on fixed points to receive the connecting pins shown and described in my aforesaid Letters Patent. I have found that there are such irregularities in car truck construction, that sometimes considerable adjustment is required of the meeting portions of the carrier bars and guard bars in relation to each other. Another purpose for providing for the relative adjustment of the carrier and guard bars at their meeting or joined outer portions is to reestablish the said bars into their original relation in the event that the carrier bars should take a downward "set" due to the weight imposed on them by the brake beams.

The invention will be fully understood from the detailed description hereinafter presented, reference being had to the accompanying drawings, in which:

Fig. 1 is a sectional view through a portion of a car truck equipped with the brake beam features of my invention, the section being on the dotted line 1—1 of Fig. 2;

Fig. 2 is a top view, partly broken away, of a car truck embodying the brake beam features of my invention;

Fig. 3 is a top view of one of the carrier or tramway bars detached from the truck;

Fig. 4 is a perspective view of one end portion of one of the guard bars;

Fig. 5 is a vertical longitudinal section on a larger scale through a portion of the car truck and mechanism of my invention taken on the dotted line 5—5 of Fig. 2;

Fig. 6 is a vertical transverse section through the same taken on the dotted line 6—6 of Fig. 5;

Fig. 7 is a vertical transverse section through a portion of the same taken on the dotted line 7—7 of Fig. 5;

Fig. 8 is a vertical longitudinal section corresponding with Fig. 5 but on a smaller scale, showing a modified construction of a portion of my invention, and Fig. 9 is a vertical transverse section through the same, on a larger scale, taken on the dotted line 9—9 of Fig. 8.

In the drawings, referring to Figs. 1 to 7 inclusive, 10 designates a portion of a well-known channel form of spring plank constituting a portion of a car truck of usual type, and 11, 12 indicate portions of inside-hung trussed brake beams of customary type, each comprising the usual compression member 13 and tension member 14. These brake beams carry customary brake heads 15 which are suspended by usual hangers 16 and have applied to them the brake shoes 17 adapted to the car wheels 18, as indicated by dotted lines in Fig. 1.

My invention does not involve any change in brake beams, their shoes or their hangers, which form two points of the suspension.

My invention pertains more especially to the carrier or tramway bars 19, 20 which are duplicated at the opposite sides of the truck, as usual, and form two means or points of suspension, to the bar 21 whose end portions afford safety guard members 22, 23 and are adjustably and detachably connected with the outer ends of said carrier bars, said bar 21 being duplicated at the opposite sides of the truck, and to the means for securing the outer end portions of the tramway bars to the outer end portions of the safety guard bars.

The carrier or suspension bars 19, 20 correspond with each other, but in service extend longitudinally in opposite directions, as shown, and said bars are preferably of inverted channel-shape in cross-section and present approximately convex upper surfaces. The bars 19, 20 have straight horizontal inner end portions, and thence said bars turn upwardly, as at 24, and thence incline upwardly and outwardly below and to receive and direct the tension members 14 of the brake beams, the outer ends of said carrier or suspension members 19, 20 being turned longitudinally on return bends toward each other and forming horizontal sections 25 whose formation causes the grooved side of the channel bars to face upwardly. I tooth the opposite flanges of the horizontal bar sections 25, as at 26, the teeth forming racks which receive corresponding rack teeth 27 formed in the flanges of the outer ends of the guard bar members 22, 23, as shown in Fig. 1.

The bar 21 furnishing the safety guard members or bars 22, 23 is secured upon the upper surface of the spring plank by means of straps 28, the middle portion of said bar 21 being straight and resting upon the spring plank and the bar thence extending upwardly along the flanges of the spring plank and thence extending longitudinally on horizontal lines in opposite directions to form safety guard members 22, 23.

The means for securing the carrier or suspension bars 19, 20 to the spring plank 10 is a channel supporting bracket 30, shown more clearly in Fig. 6, which is secured against the bottom of the spring plank by the same rivets 31 which secure the middle portion of the bar 21 against the upper surface of the spring plank. The bracket 30 is of channel shape so as to afford an upwardly projecting portion 32 to engage the top of the lower surface of the bars 19, 20 and longitudinal seats 33 to receive the lower side edges of the bars 19, 20, as clearly represented in Fig. 6. The bars 19, 20 are in two separate pieces and are adjustable longitudinally within the bracket 30, that is said bars 19, 20 may be pushed toward each other or drawn from each other or otherwise adjusted longitudinally to meet the conditions that may arise with respect to different trucks and irregularities in the construction of what may be said to be like trucks. The adjustment of the bars 19, 20 toward or from each other is also desirable in presenting their proper surfaces to the tension members 14 of the brake beams.

The outer ends of the safety guard members 22, 23 have secured to them by rivets 34 downwardly extending loops or straps 35, said straps extending transversely across the upper surfaces of the safety guard bars and thence extending downwardly to a sufficient extent to pass below the lower surface of the toothed sections 25 of the carrier or suspension bars 19, 20, and said straps in the sides of their lower ends being apertured, as at 36, to receive a transverse wedge pin 37 which, as shown in Figs. 5 and 7, closely engages the lower surface of the toothed section 25 and binds the same against the toothed section at the ends of the safety guard bars 22, 23. The pin 37 is of special construction in that its forward end is tapered and is in such relation to the lower surface of the toothed sections 25 as to wedge said sections upwardly against the toothed sections of the safety guard members 22, 23.

In assembling the mechanism of my invention I first secure the bar 21, supporting bracket 30 and straps 28 to the spring plank by means of the rivets 31, and thereafter the inner horizontal portions of the carrier or suspension bars 19, 20 are slid endwise toward each other into the channel of the bracket 30, and the upper longitudinal horizontal sections 25 of the carrier or suspension bars 19, 20 are slid between the sides of the straps 35, their teeth 26 being placed in engagement with the teeth 27 of the safety guard bar members 22, 23.

The carrier or suspension bars 19, 20 will be adjusted longitudinally to suit such irregularities as may be found to exist in car truck structures or in the hanging of the brake beams or other conditions, and in this adjstment the bars 19, 20 are moved toward or from each other so as to vary the relation of the inclined portions of the carrier bars with regard to the tension members 14 of the brake beams. After the bars 19, 20 have been correctly adjusted with relation to the brake beams and the safety guard bars 22, 23, they will be secured in such adjustment by the application to the straps 35 of the wedge locking pins 37, said pins being driven through the openings 36 in the sides of the straps 35 and binding strongly against the lower surfaces of the sections 25 of the bars 19, 20, thereby securing the bars 19, 20 in their adjusted relation to the safety guard bars and other features of the mechanism. I may apply to the pins 37 a lock 38, which is more clearly shown in Figs. 7 and 9, and which consists of a strip of metal having one apertured end 39 against one side of the strap 35, a similar apertured end 40 against the other side of the strap 35, a transverse member 41 connecting said members 39, 40, and extension member 42 which is bent outwardly and downwardly against the head of the pin 37 so as to prevent the escape of said pin, even though the cotter key shown in Fig. 9 should be omitted or lost from the pin 37. The lock 38 is of sheet metal and the pin 37 extends through holes in the members 39, 40 thereof.

In my hereinbefore-mentioned application Serial No. 725,318 I illustrate means for adjusting the end of the carrier or suspension bars with relation to the end of the safety guard bars, but I have found in practice that sometimes variations in car truck structures and in brake beam hangings are quite pronounced and require a wider range of adjustment than I would have been able to obtain from the features of adjustment described in my aforesaid application, and to meet this condition is one of the purposes of the present invention which permits me to secure quite an extended range of adjustment between the carrier or suspension bars and the safety guard bars.

The carrier bars 19, 20 are normally separated from each other at their inner ends, as indicated by dotted lines in Fig. 1, and said bars being independent of each other, either may be adjusted longitudinally in accordance with the conditions that may be met. I preferably make the bar 21 in one integral piece, as shown, but I have also formed said bar in separate pieces.

The teeth 26 and teeth 27 being formed in the flanges of the channel bars from which the carriers or suspension bars 19, 20 are formed and from which the bar 21 is formed, do not weaken the main body of the bars, which are left plain across their width between the said flanges, as shown in Figs. 2, 3 and 5.

In Figs. 8 and 9 I illustrate a modification, and therein I number the carrier or suspension bar 42 and the guard bar member 43, the bar 43 being secured to the spring plank 10 by a strap 44, and the carrier or suspension bar 42 being adjustably supported below the spring plank in a bracket 45 corresponding with the bracket 30 shown in Fig. 6.

In Fig. 8 the modification resides mainly in having the return end 46 of the carrier or suspension bar 42 extended above the outer end of the guard bar 43 instead of below the same, as in Fig. 5, this alteration in the relationship of the two bars resulting in the necessity of forming rack teeth 47 in the lower body portion of the return member 46 and in forming the cooperating rack teeth 48 in the body of the top portion of the guard bar 43, this construction being less preferable than that shown in Fig. 5. The extreme end portion of the return bend 46 of the carrier or suspension bar 42 is formed into a loop or strap 49, which encloses the transverse portion of a strap 50 corresponding with the strap 35 shown in Fig. 4 and whose ends extend downwardly at the opposite sides of the edge portions of the end member 46 and guard bar 43 and receive the wedge-pin 51, shown in detail in Fig. 9 and corresponding exactly with the pin 37 shown in Figs. 5 and 7. The pin 51 will preferably have a cotter key 52 and also a pin lock 53 which corresponds exactly with the pin lock 38 shown in Fig. 7. In Fig. 5 the strap 35 is carried by the safety guard member and extends downwardly at the opposite edges of the return portion 25 of the carrier or suspension bar member, and this construction is reversed in Figs. 8 and 9 so as to indicate that the invention is not specifically limited to the details permitting of the longitudinal adjustment of the carrier or suspension bar members with relation to the guard bar members.

One of the main objects of the invention is to permit of the relative longitudinal adjustment of the carrier bars and safety guard bars to accommodate the mechanism to such condition as may be found in car trucks to which the mechanism is to be applied, and to adequately lock said bars together in their adjusted relation. The carrier bars and guard bars are of substantial thickness and rigidity, and the guard bars aid in supporting the carrier bars against deflection by the weight of the beams imposed upon them. The safety guard bars are above the brake beams and on the same vertical plane with the carrier bars, and said safety guard bars not only aid in sustaining the carrier bars in their adjusted positions, but prevent the brake beams in the event of accident to their hangers from being carried upwardly over the wheels of the car truck.

In adjusting the carrier bars 19, 20 to the tension rods 14 of the brake-beams, the bars at each side of the spring plank are separately adjusted in the following manner, to-wit: The brake-beam at one side of the spring plank is pressed toward the adjacent truck wheels 18 until its brake-shoes 17 firmly engage the same, and thereupon and while the shoes are held in engagement with said wheels, the carrier bars, as 19, are adjusted longitudinally until they engage the tension members of said beam, as shown in Fig. 1, whereupon the engaging end portions of said carrier bars and their coacting guard bars are securely clamped together by the straps 35 and pins 37, after which the brake-beam is allowed to swing from the car-wheels. The carrier bars at opposite sides of the spring plank may require different degrees of longitudinal adjustment, and this variation of adjustment is permitted by my invention, rendering it always possible to present the correct surface portions of the carrier bars to the tension members of the brake-beams.

The invention is not limited to any special spring plank structure, several forms of the same being well known.

What I claim as my invention and desire to secure by Letters-Patent, is:

1. In a car-truck having a spring plank and an inside hung brake-beam, longitudinally adjustable carrier or suspension bars inclined upwardly below the end portions of the beam, safety guard bars extending from the spring plank over the brake-beam and said carrier bars, means supporting the carrier bars from the spring plank and permitting longitudinal adjustment thereof, said guard bars and carrier bars having overlapping outer end portions, and means for clamping said end portions in fixed relation to each other after the longitudinal adjustment of the carrier bars.

2. In a car-truck having a spring plank and an inside hung brake-beam, longitudinally adjustable carrier or suspension bars inclined upwardly below the end portions of the beam, safety guard bars extending from the spring plank over the brake-beam and said carrier bars, means supporting the carrier bars from the spring plank and permitting longitudinal adjustment thereof, said carrier bars having return bent horizontal end portions in overlapping relation to the end portions of the guard bars, and means for clamping said overlapping end portions of the carrier and guard bars in fixed relation to each other after the longitudinal adjustment of the carrier bars.

3. In a car-truck having a spring plank and an inside hung brake-beam, longitudinally adjustable carrier or suspension bars inclined upwardly below the end portions of the beam, safety guard bars extending from the spring plank over the brake-beam and said carrier bars, means supporting the carrier bars from the spring plank and permitting longitudinal adjustment thereof, said guard bars and carrier bars having overlapping toothed intermeshing outer end portions, and means for clamping said end portions in fixed relation to each other after the longitudinal adjustment of the carrier bars.

4. In a car-truck having a spring plank and an inside hung brake-beam, longitudinally adjustable carrier or suspension bars inclined upwardly below the end portions of the beam, safety guard bars extending from the spring plank over the brake-beam and said carrier bars, means supporting the carrier bars from the spring plank and permitting longitudinal adjustment thereof, said carrier bars having return bent horizontal end portions formed with transverse teeth and said guard bars having horizontal end portions formed with transverse teeth meshing with the teeth on the carrier bars, and means for clamping said end portions of said respective bars in firm relation to each other after the longitudinal adjustment of the carrier bars.

5. In a car-truck having a spring plank and an inside hung brake-beam, longitudinally adjustable carrier or suspension bars inclined upwardly below the end portions of the beam, safety guard bars extending from the spring plank over the brake-beam and said carrier bars, means supporting the carrier bars from the spring plank and permitting longitudinal adjustment thereof, said carrier bars having return bent horizontal end portions formed with transverse teeth and said guard bars having horizontal end portions formed with transverse teeth meshing with the teeth on the carrier bars, and means for clamping said end portions of said respective bars in firm relation to each other after the longitudinal adjustment of the carrier bars, said clamping means consisting of a strap rigidly secured to one of said bars and having apertured sides extending below the side edges of the other bar and a pin extending transversely through said sides and binding the end portions of the bars in firm relation to each other.

6. In a car-truck having a spring plank and an inside hung brake-beam, longitudinally adjustable carrier or suspension bars inclined upwardly below the end portions of the beam, safety guard bars extending from the spring plank over the brake-beam and said carrier bars, means supporting the carrier bars from the spring plank and permitting longitudinal adjustment thereof, said guard bars and said carrier bars being of channel cross section and having overlapping outer end portions formed in their respective flanges with transverse intermeshing teeth, and means for clamping said end portions in firm relation to each other after the longitudinal adjustment of the carrier bars.

7. In a car-truck having a spring plank and an inside hung brake-beam, longitudinally adjustable carrier or suspension bars inclined upwardly below the end portions of the beam, safety guard bars extending from the spring plank over the brake-beam and said carrier bars, means supporting the carrier bars from the spring plank and permitting longitudinal adjustment thereof, said guard bars and said carrier bars being of channel cross section, said guard bars having horizontal outer end portions formed in their side flanges with teeth and said carrier bars having return bent horizontal outer end portions formed in their side flanges with teeth which intermesh with the teeth on the guard bars, and means for clamping the toothed end portions of the respective bars in firm relation to each other after the longitudinal adjustment of the carrier bars.

8. In a car-truck having a spring plank and inside hung brake-beams, bars at opposite sides of the truck having depressed middle portions secured to the spring plank and thence extending upwardly and thence longitudinally in opposite directions over the brake-beams to form safety guard bars for said beams, independent carrier bars extending longitudinally in opposite directions from below the spring plank and inclining upwardly to receive end portions of the brake-beams, a supporting bracket below the spring plank receiving the inner end portions of the carrier bars and permitting longitudinal adjustment of said bars, said guard bars and carrier bars having overlapping outer end portions, and means for clamping said end portions in fixed relation to each other after the longitudinal adjustment of the carrier bars.

9. In a car-truck having a spring plank and inside hung brake-beams, bars at opposite sides of the truck having depressed middle portions secured to the spring plank and thence extending upwardly and thence longitudinally in opposite directions over the brake-beams to form safety guard bars for said beams, independent carrier bars extending longitudinally in opposite directions from below the spring plank and inclining upwardly to receive end portions of the brake-beams, a supporting bracket below the spring plank receiving the inner end portions of the carrier bars and permitting longitudinal adjustment of said bars, said guard bars and carrier bars having overlapping toothed intermeshing outer end portions, and means for clamping said end portions in fixed relation to each other after the longitudinal adjustment of the carrier bars.

10. In a car-truck having a spring plank and inside hung brake-beams, bars at opposite sides of the truck having depressed middle portions secured to the spring plank and thence extending upwardly and thence longitudinally in opposite directions over the brake-beams to form safety guard bars for said beams, independent carrier bars extending longitudinally in opposite directions from below the spring plank and inclining upwardly to receive end portions of the brake beams, a supporting bracket below the spring plank receiving the inner end portions of the carrier bars and permitting longitudinal adjustment of said bars, said carrier bars having return bent horizontal end portions formed with transverse teeth and said guard bars having horizontal end portions formed with transverse teeth meshing with the teeth on the carrier bars, and means for clamping said end portions of said respective bars in firm relation to each other after the longitudinal adjustment of the carrier bars.

11. In a car-truck having a spring plank and inside hung brake-beams, bars at opposite sides of the truck having depressed middle portions secured to the spring plank and thence extending upwardly and thence longitudinally in opposite directions over the brake-beams to form safety guard bars for said beams, independent carrier bars extending longitudinally in opposite directions from below the spring plank and inclining upwardly to receive end portions of the brake-beams, a supporting bracket below the spring plank receiving the inner end portions of the carrier bars and pemitting longitudinal adjustment of said bars, said guard bars and said carrier bars being of channel cross section and having overlapping outer end portions formed in their respective flanges with transverse intermeshing teeth, and means for clamping said end portions in firm relation to each other after the longitudinal adjustment of the carrier bars.

12. In a car-truck having a spring plank and inside hung brake-beams, bars at opposite sides of the truck having depressed middle portions secured to the spring plank and thence extending upwardly and thence longitudinally in opposite directions over the brake-beams to form safety guard bars for said beams, independent carrier bars extending longitudinally in opposite directions from below the spring plank and inclining upwardly to receive end portions of the brake-beams, a supporting bracket below the spring plank receiving the inner end portions of the carrier bars and permitting longitudinal adjustment of said bars, said guard bars and said carrier bars being of channel cross section, said guard bars having horizontal outer end portions formed in their side flanges with teeth and said carrier bars having return bent horizontal outer end portions formed in their side flanges with teeth which intermesh with the teeth on the guard bars, and means for clamping the toothed end portions of the respective bars in firm relation to each other after the longitudinal adjustment of the carrier bars.

In testimony whereof I affix my signature.

SETH A. CRONE.